United States Patent
Usui

(10) Patent No.: US 6,477,877 B1
(45) Date of Patent: Nov. 12, 2002

(54) MANUFACTURING TOOL FOR FLUID BEARING DEVICE

(75) Inventor: Motonori Usui, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 81 days.

(21) Appl. No.: 09/705,718

(22) Filed: Nov. 6, 2000

(30) Foreign Application Priority Data

Nov. 5, 1999 (JP) .......................................... 11-315494

(51) Int. Cl.[7] .......................... B24B 39/00; B21C 37/30
(52) U.S. Cl. ...................... 72/75; 29/898.02; 29/90.01
(58) Field of Search .............................. 29/898.02, 724, 29/90.01; 72/75

(56) References Cited

U.S. PATENT DOCUMENTS

| 1,683,044 A | * | 9/1928 | Mongeau |
| 3,934,443 A | * | 1/1976 | Keen |
| 4,866,966 A | * | 9/1989 | Hagen |
| 5,265,334 A | * | 11/1993 | Lucier |
| 5,269,164 A | * | 12/1993 | Choi |
| 5,520,038 A | * | 5/1996 | Clark et al. |
| 5,802,900 A | * | 9/1998 | Lee |
| 5,946,958 A | * | 9/1999 | Clark et al. |

FOREIGN PATENT DOCUMENTS

| JP | 62-193769 | * | 8/1987 |
| JP | 63-309341 | * | 12/1988 |
| JP | 2002-018543 | * | 1/2002 |

* cited by examiner

Primary Examiner—I. Cuda-Rosenbaum
Assistant Examiner—Eric Compton
(74) Attorney, Agent, or Firm—Sughrue Mion, PLLC

(57) ABSTRACT

A manufacturing tool is inserted in a hole formed in a work piece for forming a fluid bearing groove on an inner peripheral surface of the hole. A tool shaft is rotated in the hole while being moved in an axial direction thereof. A plurality of balls are rotatably supported on an outer peripheral face of the tool shaft. The balls are to be abutted against the inner peripheral surface of the hole to form the fluid bearing groove thereon in accordance with the movement of the tool shaft. A retainer is detachably fitted on the outer peripheral face of the tool shaft so as to retain the balls on the tool shaft. A fixing member is detachably fitted with the tool shaft so as to fix the retainer on the tool shaft. The balls can be replaced when the fixing member and the retainer is detached from the tool shaft.

13 Claims, 6 Drawing Sheets

MANUFACTURING TOOL FOR FLUID BEARING DEVICE

BACKGROUND OF THE INVENTION

The present invention relates to a manufacturing tool for a fluid bearing device in which constituent parts can be exchanged for new ones so that the life of a tool is improved greatly, and particularly to a manufacturing tool for forming a dynamic pressure generating groove on a fluid bearing device.

A manufacturing tool a groove-including fluid bearing device shown in FIG. 10 is known as a related manufacturing tool for forming a dynamic pressure generating groove in a fluid bearing device. The manufacturing tool a bearing device is provided for forming a dynamic pressure generating groove in an inner circumferential surface of a fluid bearing device. The apparatus comprises a shaft 21, rolling balls 23, and a ball gauge 24. A circumferential groove 22 is provided in the outer circumference of the shaft 21. A plurality of holes are formed in the cylindrical ball gauge 24. The rolling balls 23 dropped into the holes respectively are fitted into the circumferential groove 22 so that the shaft 21 and the ball gauge 24 are connected to each other. The rolling balls 23 are partially protruded from the outer circumferential surface of the ball gauge 24. When the shaft 21 is axially moved while being rotated in the condition that the manufacturing tool is inserted in the inner circumference of a sleeve 25 as a work piece, the rolling balls 23 come into pressure contact with an inner circumference of the sleeve 25 to thereby form predetermined dynamic pressure generating grooves in the inner circumference of the sleeve In the related art shown in FIG. 10, however, the rolling balls 23 always touch fixed positions of the groove 22. Hence, when grooving is performed, abrasion of the rolling balls 23 against the groove 22, especially against the bottom surface of the groove 22, is so rapid that the tool must be exchanged for new one frequently. Moreover, the center of the tool must be aligned with the center of a product accurately whenever the tool is exchanged for new one. There was a problem that a great deal of time was required for this arrangement.

Moreover, the circumferential edges of the holes formed in the ball gauge 24 and receiving the rolling balls 23 dropped down thereinto are caulked or a stop ring is attached so that the rolling balls 23 are prevented from drifting or dropping out. Hence, even in the case where a part of the rolling balls 23 has worn out, it is impossible to exchange only the part. The whole tool must be exchanged. There was also a problem that the cost of the tool became high. Moreover, the rolling balls 23 cannot be fixed sufficiently by the method using caulking or the stop ring for preventing the rolling balls 23 from dropping out. Hence, the rolling balls 23 may drop out when grooving is performed. There was a further problem that the number of grooves ran short. Moreover, when grooving is performed, the rolling balls 23 cannot always smoothly rotate. There was a further problem that the grooves after grooving became different in depth.

SUMMARY OF THE INVENTION

The present invention is provided to solve the aforementioned problems in the related art and an object of the present invention is to provide a manufacturing tool for a fluid bearing device, in which parts of a tool for producing the fluid bearing device can be individually exchanged for new ones so that, when a part has worn out, only the part can be exchanged for a new one to thereby elongate the life of the tool as a whole and reduce the cost of the tool as whole.

In order to achieve the above object, according to the present invention, there is provided a manufacturing tool inserted in a hole formed in a work piece for forming a fluid bearing groove on an inner peripheral surface of the hole, comprising:

a tool shaft being rotated in the hole while being moved in an axial direction thereof;

a plurality of balls rotatably supported on an outer peripheral face of the tool shaft, which are to be abutted against the inner peripheral surface of the hole to form the fluid bearing groove thereon in accordance with the movement of the tool shaft;

a retainer detachably fitted on the outer peripheral face of the tool shaft so as to retain the balls on the tool shaft;

a fixing member detachably fitted with the tool shaft so as to fix the retainer on the tool shaft, wherein the balls can be replaced when the fixing member and the retainer is detached from the tool shaft.

According to the above configuration, abraded parts such as balls can be partially exchanged for new ones. It is unnecessary to exchange the manufacturing tool entirely. The cost of the manufacturing tool can be reduced greatly.

Preferably, the manufacturing tool further comprises a ball bearing member accommodated in an axial hole formed in the tool shaft so as to be axially movable therein while bearing the balls in bearing recesses formed on an outer peripheral face thereof. Here, the bearing recesses are shaped such that the balls are situated at different positions therein in accordance with the direction of the axial movement of the tool shaft.

According to the above configuration, when grooving is performed, a load of the balls applied on the ball bearing member can be distributed into a forward stroke and a backward stroke. Hence, the quantity of abrasion of the balls, the ball bearing member, etc. can be reduced, so that the life of the manufacturing tool can be elongated.

Preferably, the ball bearing member is a shaft member having a circular cross section. Here, the largest diameter of the ball bearing member is made smaller than the diameter of the hole of the work piece so as to define a clearance therebetween. The ball bearing member can be made eccentric and inclined with respect to the axial center of the tool shaft in a range of the clearance.

According to the above configuration, accuracy can be kept high on the basis of the floating effect even in the case where the center of the tool shaft is aligned with the center of the work piece incorrectly. Hence, shortening the time required for arrangement of the alignment and great improvement of quality can be achieved.

According to the present invention, there is also provided a manufacturing tool for forming a fluid bearing groove on an outer peripheral surface of a work piece, comprising:

a tool shaft formed with an axial hole extending in an axial direction thereof, which is to be rotated while being moved in the axial direction around the work piece inserted in the axial hole;

a plurality of balls rotatably supported on an inner peripheral face of the tool shaft, which are to be abutted against the outer peripheral surface of the work piece to form the fluid bearing groove in accordance with the movement of the tool shaft;

a retainer detachably fitted on the inner peripheral face of the tool shaft so as to retain the balls on the tool shaft;

a fixing member detachably fitted with the inner peripheral face of the tool shaft so as to fix the retainer on the tool shaft, wherein the balls can be replaced when the fixing member and the retainer is detached from the tool shaft.

According to the above configuration, abraded parts such as balls can be partially exchanged for new ones. It is unnecessary to exchange the manufacturing tool as a whole. The cost of the manufacturing tool can be reduced greatly.

Preferably, the manufacturing tool further comprises a ball bearing member provided on an outer periphery of the tool shaft so as to be movable in the axial direction of the tool shaft while bearing the balls in bearing recesses formed on an inner peripheral face thereof. Here, the bearing recesses are shaped such that the balls are situated at different positions therein in accordance with the direction of the axial movement of the tool shaft.

According to the above configuration, when grooving is performed, a load of the balls applied on the ball bearing member can be distributed into a forward stroke and a backward stroke. Hence, the quantity of abrasion of the balls, the ball bearing member, etc. can be reduced, so that the life of the manufacturing tool can be elongated.

Preferably, the ball bearing member is provided as a cylindrical member in which an inner periphery thereof has a circular cross section. Here, a clearance is formed between the inner periphery of the ball bearing member and the outer periphery of the tool shaft.

According to the above configuration, accuracy can be kept sufficiently on the basis of the floating effect even in the case where the center of the tool shaft is aligned with the center of the work piece incorrectly. Hence, shortening the time required for arrangement of the alignment and great improvement of quality can be achieved.

DETAILED DESCRIPTION OF THE PREFERRED EMBODIMENTS

A first embodiment of a manufacturing tool for a fluid bearing device according to the present invention will be described below with reference to the accompanying drawings.

The manufacturing tool for a fluid bearing device according to the present invention is classified into the following two groups. One group is a manufacturing tool for a fluid bearing device having a bearing surface formed by machining an inner circumference of a pipe-like or sleeve-like work piece, with a center shaft inserted therein. The other group is a manufacturing tool for a fluid bearing device having a bearing surface formed by machining an outer circumference of a shaft-like work piece serving as a center shaft inserted in a hole of a pipe-like or sleeve-like bearing. The former apparatus will be described first.

Figure 1:
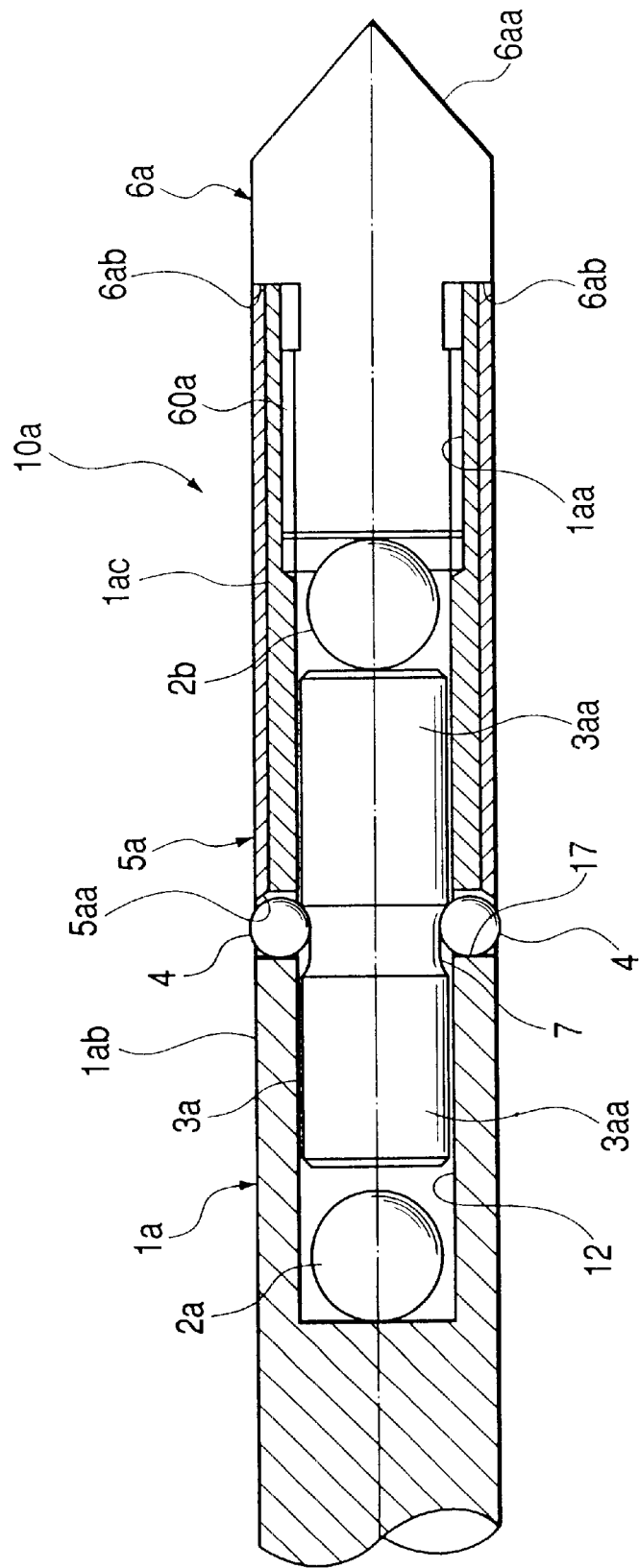
FIG. 1 is a side sectional view showing a manufacturing tool for a fluid bearing device according to a first embodiment of the present invention.
Figure 2:
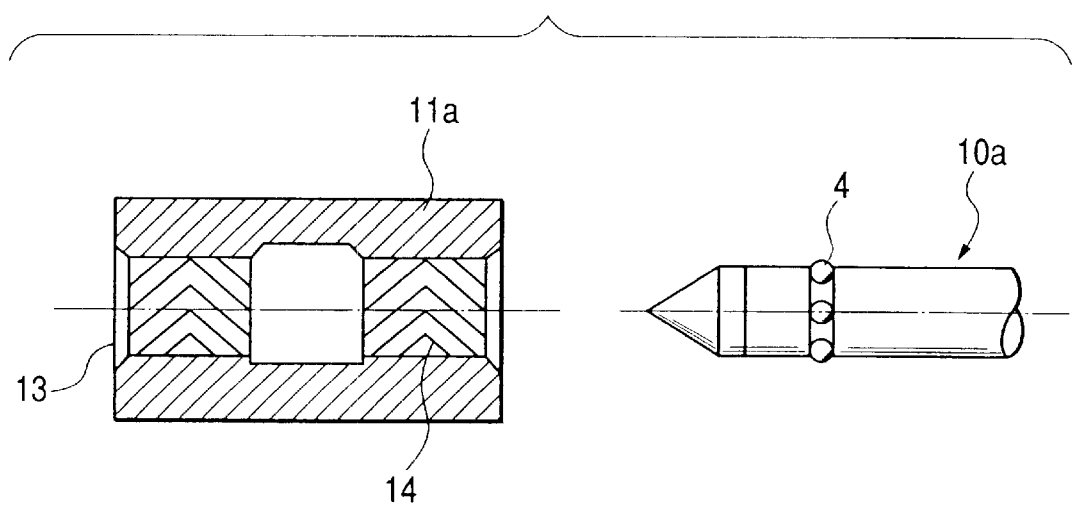
FIG. 2 is a side view showing a combination of a work piece and the manufacturing tool.

The manufacturing tool for a fluid bearing device shown in FIGS. 1 and 2 is an apparatus for forming a fluid bearing dynamic pressure generating groove 14 in an inner circumferential surface of a work piece 11a by axially moving a manufacturing tool 10a having a plurality of rolling balls 4 rotatably held in its outer circumference while rotating the manufacturing tool 10a relative to the work piece 11a in the condition that the manufacturing tool 10a is inserted in a hole 13 formed in the work piece 11a. These constituent parts will be described below.

The manufacturing tool 10a includes a plurality of rolling balls 4 disposed at regular intervals in the outer circumference of the manufacturing tool 10a, a tool shaft 1a for holding the rolling balls 4 rotatably, a ball retainer 5a detachably attached onto the outer circumference of the tool shaft 1a, and a fixing member 6a for fixing the ball retainer 5a.

The tool shaft 1a has a cylindrical portion 1aa in which a center hole 12 having a uniform diameter is provided axially by a predetermined length from a forward end of the tool shaft 1a. The center hole 12 receives a rotating piece 3a serving as a ball bearing member for receiving the rolling balls 4.

Figure 3:
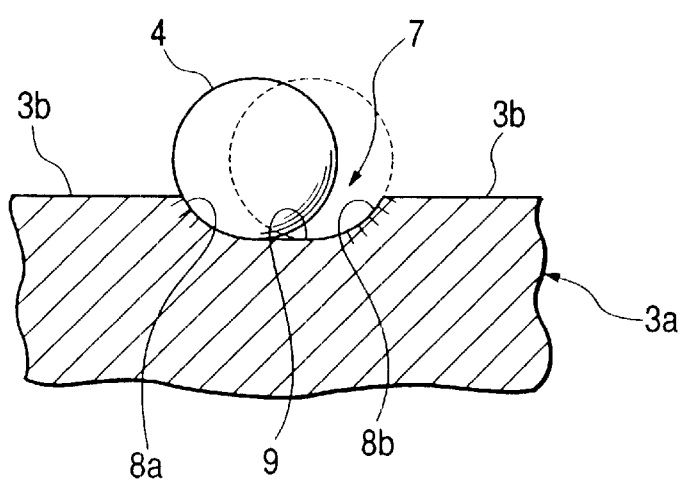
FIG. 3 is an enlarged side sectional view showing a ball bearing portion in the manufacturing tool.

The rotating piece 3a is a sectionally circular shaft body having such a suitable length as to be axially movable in the center hole 12. The rotating piece 3a has columnar portions 3aa in its opposite sides respectively, and a ball bearing portion 7 in the outer circumference of the axially center of the rotating piece 3. The ball bearing portion 7 has a diameter smaller than the outer diameter of each columnar portion 3aa. The ball bearing portion 7 is formed as a concave portion having a flat surface with a predetermined axial length so that the rolling balls 4 can take various positions when the manufacturing tool 10a is axially moved relative to the work piece 11a. That is, as shown in FIG. 3, the ball bearing portion 7 has two curved portions 8a and 8b, and a flat portion 9. The two curved portions 8a and 8b are equal in radius of curvature to the rolling balls 4 and are formed in axially opposite sides (left and right sides in FIG. 3) of the ball bearing portion 7 respectively. The flat portion 9 has a uniform outer diameter and is formed to connect the two curved portions 8a and 8b.

A sphere 2a, the rotating piece 3a, the rolling balls 4 and a sphere 2b are inserted in the center hole 12 of the tool shaft 1a. A ring-shaped ball retainer 5a serving as a ball retainer is fitted and fixed onto the outer circumference of the forward end side of the tool shaft 1a so as to tightly contact with the outer circumference of the tool shaft 1a. The tool shaft 1a further has a cylindrical portion 1ab in which a plurality of ball holes 17 are provided at circumferentially regular intervals. The ball holes 17 receive the rolling balls 4 respectively. The rolling balls 4 are located so as to be in contact with the ball bearing portion 7 of the rotating piece 3a. The rolling balls 4 received in the ball holes 17 respectively are enabled to go out of the tool shaft 1a but the ring-shaped ball retainer 5a prevents the rolling balls 4 from falling down and dropping out. The outer diameter of the ring-shaped ball retainer 5a is selected to be equal to the outer diameter of the cylindrical portion lab so as not to be protruded outward from the cylindrical portion 1ab of the tool shaft 1a. Therefore, a portion included in the cylindrical portion 1ab and located in front of the ball holes 17 is formed as a small cylindrical portion 1ac having a diameter smaller by the thickness of the ring-shaped ball retainer 5a than the diameter of the cylindrical portion 1ab. Further, an inclined surface 5aa spreading outward is formed at the ball side end of the ring-shaped ball retainer 5a so as to prevent the rolling balls 4 from falling down and dropping out.

The fixing member 6a is shaped like a cap. A tapered surface 6aa serving as a guide at the time of insertion into the work piece is formed at the forward end of the fixing member 6a. An engagement portion 6ab is formed in the middle portion of the fixing member 6a. A male screw 60a is formed on the axial base end side of the fixing member 6a. On the other hand, a female screw 1aa is formed on the forward end side of the inner circumference of the small cylindrical portion 1ac of the tool shaft 1a. Hence, the male screw 60a of the fixing member 6a can be thread-engaged with the female screw 1aa of the small cylindrical portion lac so that the fixing member 6a can be fixed. When the fixing member 6a is fixed to the small cylindrical portion 1ac of the tool shaft 1a, the engagement portion 6ab locks the ring-shaped ball retainer 5a so as to prevent the ring-shaped ball retainer 5a from dropping out.

Each of axial end faces of the columnar portions 3aa on opposite sides of the rotating piece 3a is formed to have a diameter equal to that of each of the sphere 2a and 2b. The outer diameter of each columnar portion 3aa with the axial center of the rotating piece 3a as its center is formed so as to be smaller than the inner diameter of the center hole 12 of the tool shaft 1a. Hence, a predetermined clearance is provided between the outer circumferential surface of each columnar portion 3aa of the rotating piece 3a and the inner circumferential surface of the center hole 12 of the tool shaft 1a.

Further, an axial clearance is provided between each of the spheres 2a and 2b and the rotating piece 3a in the condition that the fixing member 6a is screwed up. Hence, the rotating piece 3a is axially movable in the center hole 12. This makes it possible to axially move the rotating piece 3a relative to the ball holes 17 so that points of contact of the rolling balls 4 with the ball bearing portion 7 of the rotating piece 3a can be changed when the direction of movement of the tool shaft 1a relative to the work piece is changed.

Figure 4:
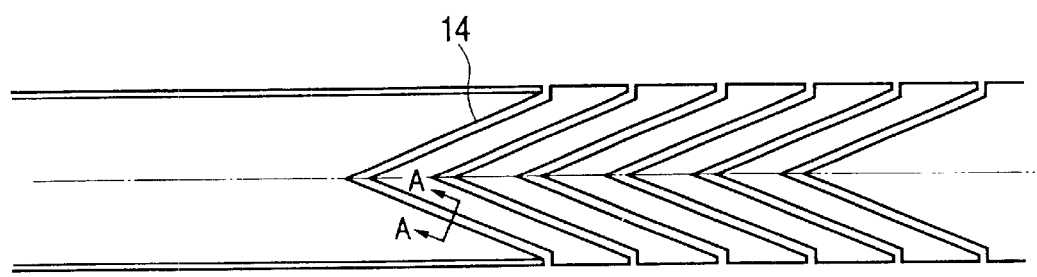
FIG. 4 is plan view showing grooves formed by the manufacturing tool.
Figure 5:
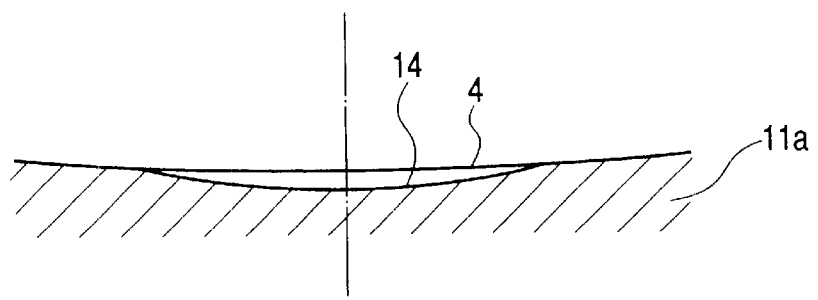
FIG. 5 is an enlarged sectional view taken along the line A—A in FIG. 4 to show one of the grooves.

In the condition that the aforementioned parts are assembled completely, the rolling balls 4 having respective inner sides supported by the ball bearing portion 7 are designed so as to be partially protruded by a predetermined size from the outer circumference of the tool shaft 1a. Because the rolling balls 4 are partially protruded from the outer circumference of the tool shaft 1a as described above, the manufacturing tool 10a can be axially moved while being rotated relative to the work piece 11a after the manufacturing tool 10a is inserted in the hole 13 of the work piece 11a which will be a bearing. Hence, grooves 14 for a fluid bearing device as shown in FIGS. 4 and 5 can be formed in the inner circumferential surface of the work piece 11a.

On this occasion, the outer diameter of the tool shaft 1a needs to be slightly smaller than the inner diameter of the work piece 11a when such fluid bearing grooves 14 are merely formed in the inner circumferential surface of the work piece 11a by means of the rolling balls 4. When machining the inner circumferential surface of the bearing and forming the grooves 14 are to be performed simultaneously, however, the outer diameter of the tool shaft 1a may be set to be equal to or slightly larger than the inner diameter of the work piece 11a. That is, the outer diameter of the tool shaft 1a may be selected in accordance with the purpose.

As shown in FIG. 2, the inner circumference of the work piece 11a is formed so that the inner diameter of the bearing portion in which the grooves 14 will be formed is smaller than the inner diameter of any other inner circumferential portion such as the inner diameter of the portion between two bearing portions. The work piece 11a shown in FIG. 2 has two bearing portions in which the grooves 14 will be formed. As known well, each groove 14 is shaped like a "V" figure in view from the inside of the work piece 11a. To form such a V-shaped groove 14, the manufacturing tool 10a is first moved axially while being rotated in one direction. Then, the manufacturing tool 10a is rotated in the reverse direction while being returned axially to form the V-shaped groove 14. In this manner, one groove 14 is formed. Incidentally, the locus of forward movement of the manufacturing tool 10a may be equal to the locus of backward movement of the manufacturing tool 10a or may be different therefrom. In the latter case, a predetermined number of grooves 14 can be formed as follows. A half of the predetermined number of grooves 14 are formed in a forward stroke and the other half are formed in a backward stroke.

When the ball bearing portion 7 is shaped to have an axially flat portion 9 as shown in FIG. 3, points of contact of the rolling balls 4 with the ball bearing portion 7 can be changed on the basis of the direction of load applied on the rolling balls 4 when the rotating piece 3a moves axially. Hence, when the manufacturing tool 10a makes a reciprocating motion to form the grooves 14 in the work piece 11a, the curved portion 8b inclusive of the flat portion 9 serves as a loaded surface in a backward stroke on the assumption that the curved portion 8a inclusive of the flat portion 9 serves as a loaded surface in a forward stroke in grooving. Because the points of contact of the rolling balls 4 with the rotating piece 3a are changed over between the forward stroke and the backward stroke in grooving as described above, the load applied on the rotating piece 3a in the radial direction owing to the axial movement and in the circumferential direction owing to the rotation can be distributed. Hence, the life of the tool can be elongated greatly.

Further, according to the present invention, the fixing member 6a screwed up can be detached by loosing the male screw 60a of the fixing member 6a from the female screw 1aa of the small cylindrical portion 1ac. When the fixing member 6a is detached, the ring-shaped ball retainer 5a is disengaged from the engagement portion 6ab of the fixing member 6a. Hence, the ring-shaped ball retainer 5a as a ball retainer can be also detached toward the axial forward end from the small cylindrical portion 1ac of the tool shaft 1a. When the ring-shaped ball retainer 5a is detached, the inclined surface 5aa provided at the ball side end of the ring-shaped ball retainer 5a gives up its function of preventing the rolling balls 4 from dropping out. Hence, the rolling balls 4 can be detached easily from the holes 17 provided in the outer circumference of the tool shaft 1a. When the rolling balls 4 are detached, the spheres 2b and 2a and the rotating piece 3a can be detached easily from the center hole 12.

Hence, parts such as the rotating balls 4, the rotating piece 3a as a ball bearing member, etc. can be exchanged for new ones easily. Even in the case where any one of the parts is abraded or broken, only the part can be exchanged for a new one. It is unnecessary to exchange the tool as a whole. The cost of the tool can be reduced greatly.

Figure 6:
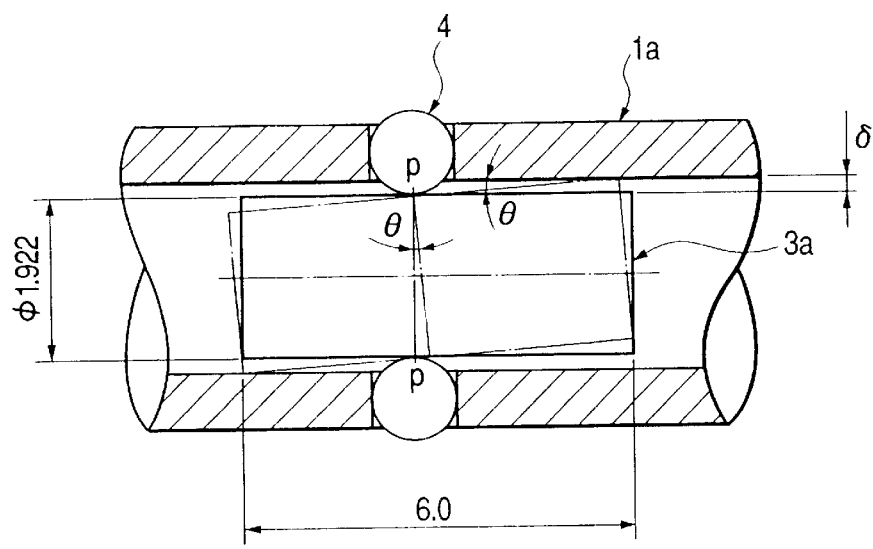
FIG. 6 is a diagram for explaining an optimum floating amount in the manufacturing device.

The condition for obtaining a floating effect securely will be described below. In FIG. 6, θ is an angle in the case where the rotating piece 3a is inclined maximum, and δ is a clearance permitting the angle θ and enabling the rotating piece 3a to move radially, that is, a quantity of floating (an appropriate clearance between the tool shaft 1a and the rotating piece 3a). If the length of the rotating piece 3a is selected to be large while the quantity δ of floating is selected to be small, the inclination of the rotating piece 3a can be reduced, that is, the angle θ can be reduced so that aligning accuracy can be kept high. If the quantity δ of floating is selected to be too small, it is difficult to set the arrangement for aligning the center of the tool with the center of the work piece at the time of machining. Therefore, the quantity δ of floating is selected to be a suitable value in consideration of facilitation of the arrangement for alignment and keeping of accuracy.

When a predetermined clearance is provided between the outer circumferential surface of the ball bearing member and the inner circumferential surface of the center hole in the aforementioned manner, accuracy can be kept high on the basis of the floating effect even in the case where the center of the tool shaft is aligned with the center of the work piece incorrectly. Hence, shortening the time required for arrangement of the alignment and great improvement of quality can be achieved.

Figure 7:
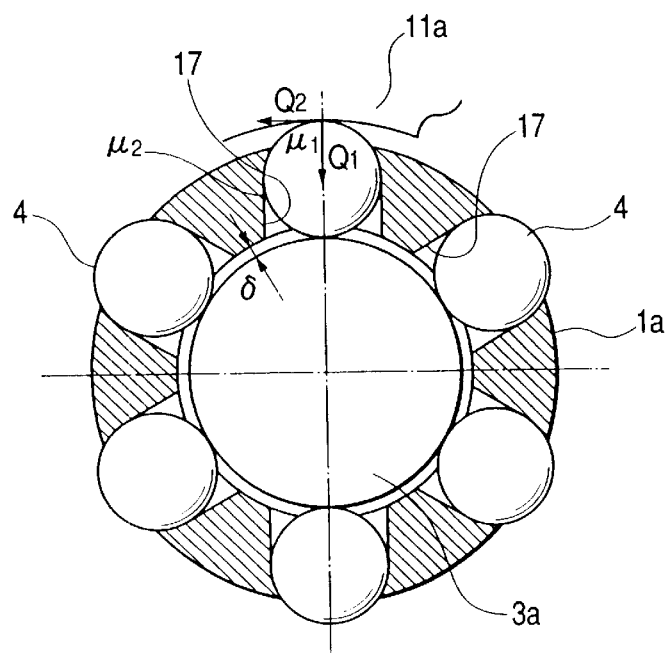
FIG. 7 is a diagram for explaining an optimum floating amount in the manufacturing device.

In FIG. 7, Q1 is a force by which the rolling ball 4 is pressed centripetally by the work piece 11a when grooving is applied to the inner circumferential surface of the work piece 11a, Q2 is a shearing force applied on the rolling ball 4 when grooving is performed, $\mu 1$ is a friction coefficient between the work piece 11a and the rolling ball 4, $\mu 2$ is a friction coefficient at a junction point between the hole 17 of the tool shaft 1a and the rolling ball 4, and δ is a quantity of floating (a clearance between the tool shaft 1a and the rotating piece 3a).

To make the floating effect secure, the friction force Q2$\mu 2$ needs to be sufficiently smaller than the reaction force Q1. In the embodiment shown in FIG. 8, if the difference in friction coefficient $\mu 2$ among the six rolling balls 4 is too large, the aligning effect owing to the reaction force Q1 is reduced so that the groove depth is apt to vary widely. Therefore, the difference in friction coefficient $\mu 2$ among the rolling balls 4 needs to be as small as possible.

In the present invention, both fitting-in accuracy and surface roughness of the contact surface between the tool shaft 1a and the rolling ball 4 are kept high in order to secure the floating effect. Moreover, the quantity of floating (0.2 mm to 0.1 mm) is also kept sufficient with respect to the depth of the groove formed in the work piece 11a.

The manufacturing tool for a fluid bearing device by forming grooves for the fluid bearing device in the outer circumferential surface of an shaft-like work piece 11b, which is a second embodiment of the present invention, will be described below.

Figure 8:
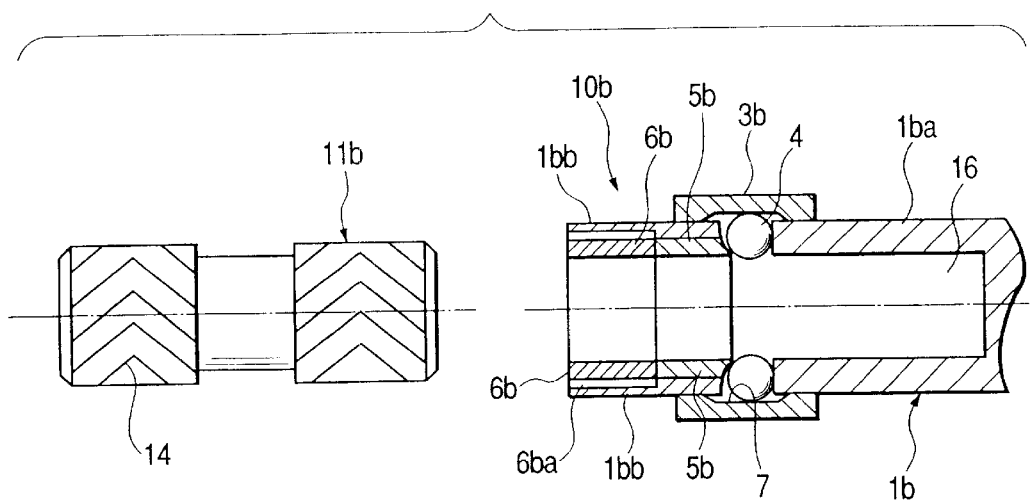
FIG. 8 is a diagram view showing a manufacturing tool for a fluid bearing device according to a second embodiment of the present invention.

The manufacturing tool for a fluid bearing device shown in FIG. 8 comprises a manufacturing tool 10b including a plurality of rolling balls 4 which are held on an inner circumference of the manufacturing tool 10b so as to be able to be protruded and rotated. When the manufacturing tool 10b is moved axially while being rotated relative to the work piece 11b in the condition that the shaft-like work piece 11b is inserted in a center hole 16 provided at a forward end of the manufacturing tool 10b, grooves 14 for the fluid bearing device are formed in the outer circumferential surface of the work piece 11b.

The manufacturing tool 10b includes, in addition to the center hole 16, a tool shaft 1b for rotatably holding the rolling balls 4, a cylindrical ball retainer 5b detachably attached onto the inner circumference of the tool shaft 1b, and a fixing member 6b for fixing the ball retainer 5b. The tool shaft 1b has a cylindrical portion 1ba in which a center hole 16 having a uniform diameter is provided axially by a predetermined length from a forward end of the tool shaft 1b. A plurality of ball holes 17 are located in the intermediate portion of the center hole 16 and provided at circumferentially regular intervals in the cylindrical portion 1ba of the tool shaft 1b. The ball holes 17 receive the rolling balls 4 respectively. The rolling balls 4 are located so as to be in contact with a ball bearing portion 7 of a ball bearing member 3b provided on the outer circumference of the tool shaft 1b. The rolling balls 4 received in the ball holes 17 respectively are enabled to inwardly go out of the tool shaft 1b but the ball retainer 5b prevents the rolling balls 4 from falling down and dropping out. The inner diameter of the ball retainer 5b is selected to be equal to the inner diameter of the cylindrical portion 1ba of the tool shaft 1b. Because the ball retainer 5b is attached to the tool shaft 1b, a portion included in the cylindrical portion 1ba and located in front of the ball holes 17 is formed as a thin cylindrical portion 1bb having an inner hole having a diameter larger by the thickness of the ball retainer 5b than the diameter of the cylindrical portion 1ba. An inclined surface spreading outward is formed at the ball side end of the ball retainer 5b so as to prevent the rolling balls 4 from falling down and dropping out.

Like the ball retainer 5b, the fixing member 6b is a cylindrical part having an inner diameter substantially equal to the inner diameter of the cylindrical portion 1ba of the tool shaft 1b. A male screw 6ba for forcing the fixing member 6b into the inner circumference of one end portion of the tool shaft 1b is formed in the outer circumference of the fixing member 6b. When the fixing member 6b and the ball retainer 5b are detached, the rolling balls 4 can be exchanged for new ones.

The ball bearing member 3b for receiving the rolling balls 4 is rotatably fitted onto the outer circumference of the tool shaft 1b.

The ball bearing member 3b is made of a pipe body having an inner circumference shaped like a circle in sectional view. The ball bearing portion 7 is provided on the inner circumferential surface of the ball bearing member 3b. Like the previous embodiment, the ball bearing portion 7 is formed as a concave portion in which the rolling balls 4 can take various positions when the manufacturing tool 10b is axially moved relative to the work piece 11b. That is, like the embodiment shown in FIG. 3, curved portions 8a and 8b equal in radius of curvature to the rolling balls 4 are formed on axially opposite sides of the ball bearing portion 7. A flat portion 9 having a uniform inner circumference is formed in the center of the ball bearing portion 7 so as to connect the curved portions 8a and 8b to each other.

Like the previous embodiment, the ball bearing member 3b is configured so that a predetermined clearance is formed between the ball bearing member 3b and the outer circumferential surface of the cylindrical portion 1ba of the tool shaft 1b to thereby exhibit a quantity of floating.

When the ball bearing portion 7 is shaped as described above, the ball bearing member 3b can be moved axially on the basis of the direction of load applied on the rolling balls 4 so that points of contact of the rolling balls 4 with the ball bearing portion 7 are changed. Hence, when the manufacturing tool 10b makes a reciprocating motion to form the grooves 14 in the work piece 11b, the curved portion 8b serves as a loaded surface in a backward stroke on the assumption that the curved portion 8a serves as a loaded surface in a forward stroke in grooving. Because the points of contact of the rolling balls 4 with the ball bearing member 3b are changed over between the forward stroke and the backward stroke in grooving as described above, the load applied on the ball bearing member 3b can be distributed. Hence, the life of the tool can be elongated greatly.

In the work piece 11b machined by the manufacturing tool 10b, the outer diameter of the bearing-forming portion having the grooves 14 formed therein is larger than that of any other portion. Also when machining is performed by the manufacturing tool 10b, the locus of forward movement of the manufacturing tool 10b may be equal to the locus of backward movement of the manufacturing tool 10b or may be different therefrom. In the latter case, a predetermined number of grooves 14 can be formed as follows. A half of the predetermined number of grooves 14 are formed in a forward stroke and the other half are formed in a backward stroke.

Figure 9:
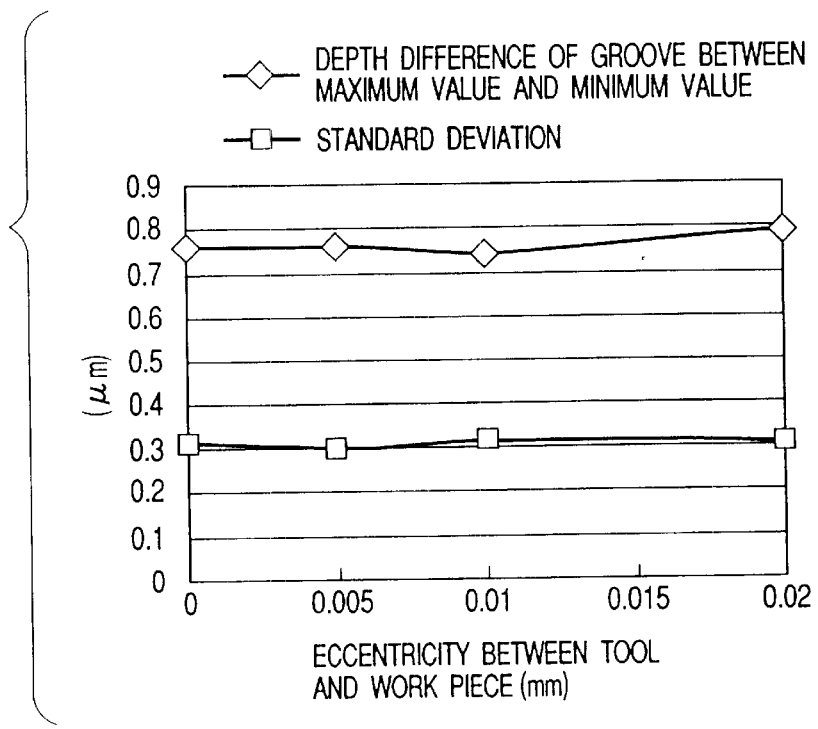
FIG. 9 is a graph showing the dependency of the deviation of the groove depth with respect to the quantity of eccentricity between the work piece and the tool.
Figure 10:
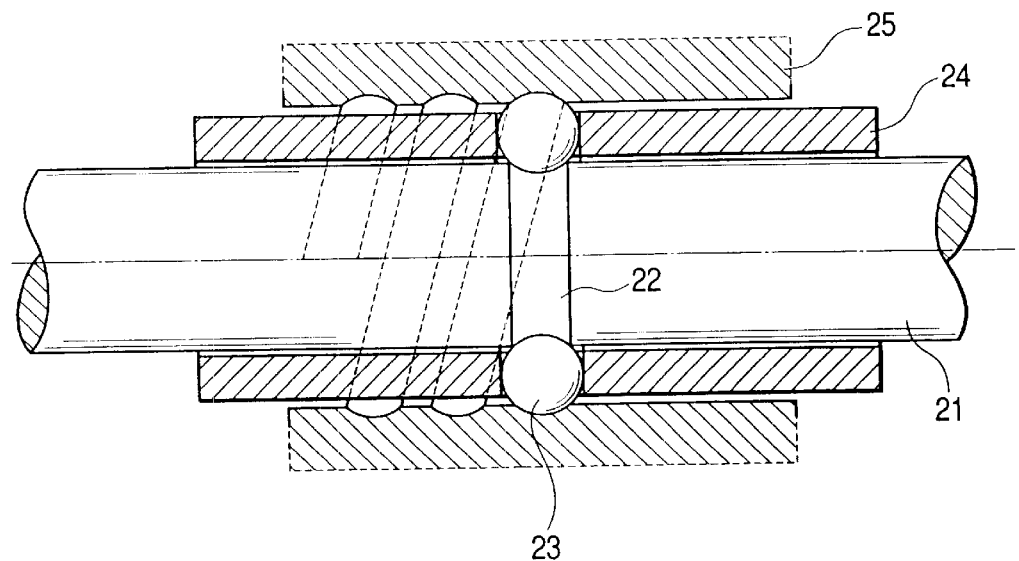
FIG. 10 is a side sectional view showing a related manufacturing tool for a fluid bearing device.

In the case where the quantity of eccentricity between the center of the work piece and the center of the bearing manufacturing tool is changed, that is, in the case where the center of the bearing manufacturing tool does not coincide with the center of the work piece when grooving is performed, a graph of FIG. 9 shows the relationship between the quantity of eccentricity and the standard deviation of groove depth or the difference between maximum and minimum values of groove depth.

As shown in the graph, in comparison between the case where the quantity of eccentricity is zero and the case where the quantity of eccentricity is changed to 0.005 mm, 0.01 mm and 0.02 mm, it is proved that either the standard deviation of groove depth or the difference between maximum and minimum values of groove depth is almost constant. That is, according to the present invention, even in the case where there is any eccentricity, the same characteristic as in the case where there is no eccentricity can be obtained. Hence, the manufacturing tool for a fluid bearing device can be obtained as an apparatus having a high floating effect.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A manufacturing tool inserted in a hole formed in a work piece for forming a fluid bearing groove on an inner peripheral surface of the hole, comprising:
    a tool shaft being rotated in the hole while being moved in an axial direction thereof;
    a plurality of balls rotatably supported on an outer peripheral face of the tool shaft, which are to be abutted against the inner peripheral surface of the hole to form the fluid bearing groove thereon in accordance with the movement of the tool shaft;
    a retainer detachable fitted on the outer peripheral face of the tool shaft so as to retain the balls on the tool shaft;
    a fixing member detachably fitted with the tool shaft so as to fix the retainer on the tool shaft,
    wherein the balls can be replaced when the fixing member and the retainer is detached from the tool shaft; and
    a ball bearing member accommodated in an axial hole formed in the tool shaft so as to be axially movable therein while bearing the balls in bearing recesses formed on an outer peripheral face thereof,
    wherein the bearing recesses are shaped such that the balls are situated at different positions therein in accordance with the direction of the axial movement of the tool shaft.

2. The manufacturing tool as set forth in claim 1, wherein the ball bearing member is a shaft member having a circular cross section;
    wherein the largest diameter of the ball bearing member is made smaller than the diameter of the hole of the work piece so as to define a clearance therebetween; and
    wherein the ball bearing member can be made eccentric and inclined with respect to the axial center of the tool shaft in a range of the clearance.

3. The manufacturing tool as set forth in claim 2, wherein the axial hole is formed with a bottom, and extends in the axial direction thereof from one end face of the tool shaft;
    wherein the tool shaft includes a first portion having a circular cross section and a first diameter, which extends from the end face thereof;
    wherein the tool shaft includes a second portion continuously connected with the first portion, having a circular cross section and a second diameter larger than the first diameter;
    wherein a plurality of through holes for receiving the balls are arranged on the connecting portion between the first and second portions of the tool shaft, which extends from an outer periphery of the tool shaft to the axial hole;
    wherein the retainer is provided as a cylindrical member having a circular cross section, and fitted with an outer periphery of the first portion of the tool shaft;
    wherein the fixing member is fixed on a fixing portion provided on an inner periphery of the first portion of the tool shaft; and
    wherein the fixing member includes an engagement portion for locking the retainer on the tool shaft.

4. The manufacturing tool as set forth in claim 3, wherein a sum of a thickness of the first portion of the tool shaft and a thickness of the retainer equals a thickness of the second portion of the tool shaft.

5. The manufacturing tool as set forth in claim 3, herein each of the bearing recesses of the ball bearing member is formed with a flat bottom extending in an axial direction of the ball bearing member; and
    wherein the largest diameter of the ball bearing member is made smaller than an inner diameter of the fixing portion.

6. The manufacturing tool as set forth in claim 3, wherein one end face of the retainer is tapered so as to retain the balls on the tool shaft; and
    wherein the other end of the retainer engages with the fixing member.

7. The manufacturing tool as set forth in claim 3, wherein the through holes are arranged on the tool shaft at predetermined intervals in a circumferential direction of the tool shaft such that the balls received in the through holes respectively define a radial position of the ball bearing member.

8. A manufacturing tool for forming a fluid bearing groove on an outer peripheral surface of a work piece, comprising:

a tool shaft formed with an axial hole extending in an axial direction thereof, which is to be rotated while being moved in the axial direction around the work piece inserted in the axial hole;

a plurality of balls rotatably supported on an inner peripheral face of the tool shaft, which are to be abutted against the outer peripheral surface of the work piece to form the fluid bearing groove in accordance with the movement of the tool shaft;

a retainer detachably fitted on the inner peripheral face of the tool shaft so as to retain the balls on the tool shaft;

a fixing member detachably fitted on the inner peripheral face of the tool shaft so as to retain the balls on the tool shaft;

a fixing member detachably fitted with the inner peripheral face of the tool shaft so as to fix the retainer on the tool shaft, wherein the balls can be replaced when the fixing member and the retainer is detached from the tool shaft; and a ball bearing member provided on an outer periphery of the tool shaft so as to be movable in the axial direction of the tool shaft while bearing the balls in bearing recesses formed on an inner peripheral face thereof;

wherein the bearing recesses are shaped such that the balls are situated at different positions therein in accordance with the direction of the axial movement of the tool shaft.

9. The manufacturing tool as set forth in claim 8, wherein the ball bearing member is provided as a cylindrical member in which an inner periphery thereof has a circular cross section; and wherein a clearance is formed between the inner periphery of the ball bearing member and the outer periphery of the tool shaft.

10. The manufacturing tool as set forth in claim 9, wherein the axial hole is formed with a bottom, and extends in the axial direction thereof from one end face of the tool shaft;

wherein the axial hole includes a first portion having a circular cross section and a first diameter, which extends from the end face the tool shaft;

wherein the axial hole includes a second portion continuously connected with the first portion, having a circular cross section and a second diameter smaller than the first diameter;

wherein a plurality of through holes for receiving the balls are arranged on the connecting portion between the first and second portions of the axial hole, which extends from the outer periphery of the tool shaft to the axial hole;

wherein the retainer is provided as a cylindrical member having a circular cross section, and fitted with an inner periphery of the first portion of the axial hole;

wherein the fixing member is fixed on a fixing portion provided on the inner periphery of the first portion of the axial hole.

11. The manufacturing tool as set forth in claim 10, wherein an inner diameter of the retainer is equal to the second diameter of the axial hole.

12. The manufacturing tool as set forth in claim 10, wherein each of the bearing recesses of the ball bearing member is formed with a flat bottom extending in an axial direction of the ball bearing member; and wherein the inner diameter of the ball bearing member is made larger than an outer diameter of the tool shaft.

13. The manufacturing tool as set forth in claim 10, wherein one end face of the retainer is tapered so as to retain the balls on the tool shaft; and wherein the other end of the retainer includes an engagement member engaged with the fixing member.

* * * * *